March 3, 1964  B. C. DOUGLAS  3,123,299
GAS REGULATOR SYSTEM
Filed March 5, 1962  6 Sheets-Sheet 2
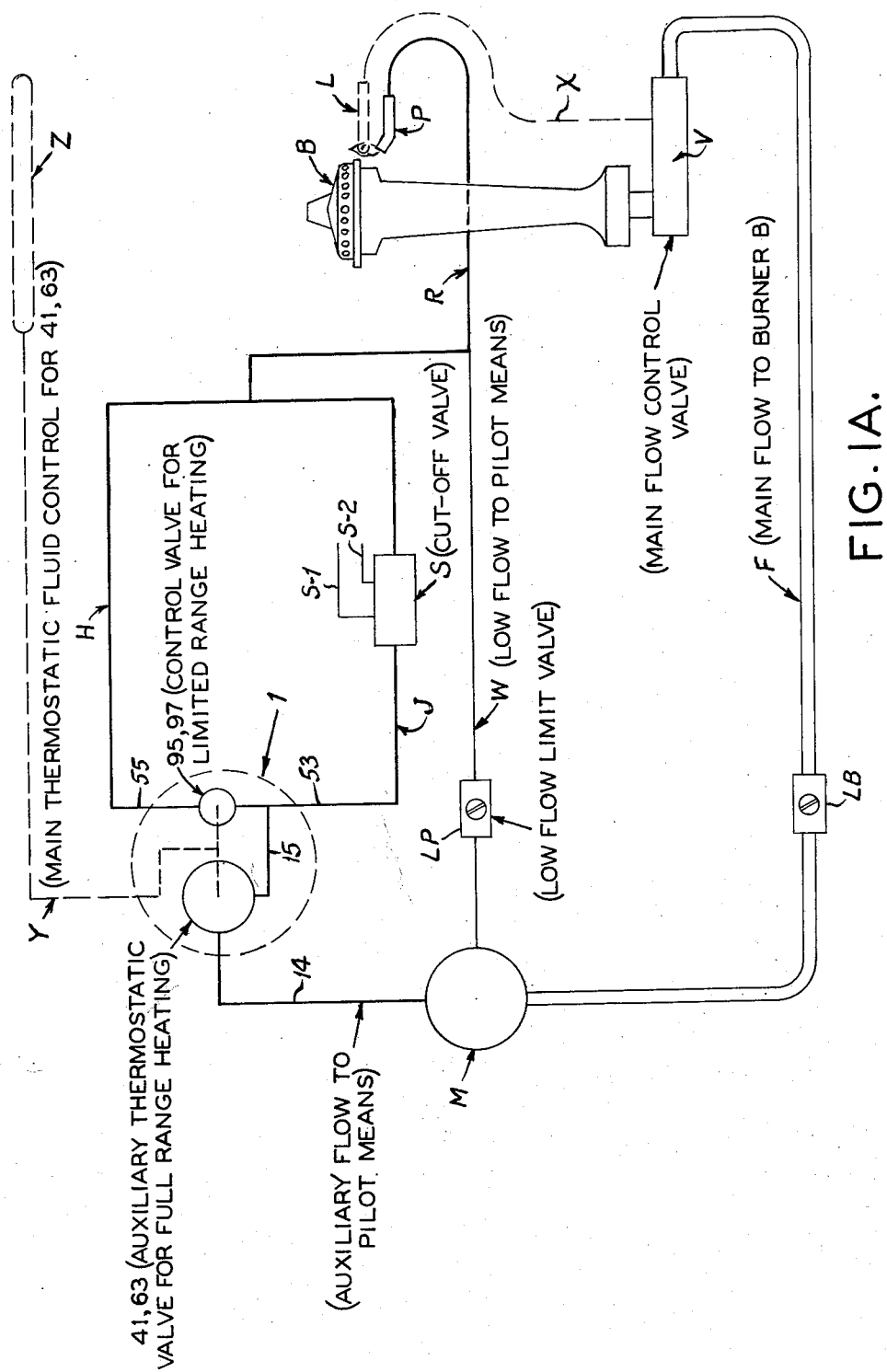
FIG. IA.

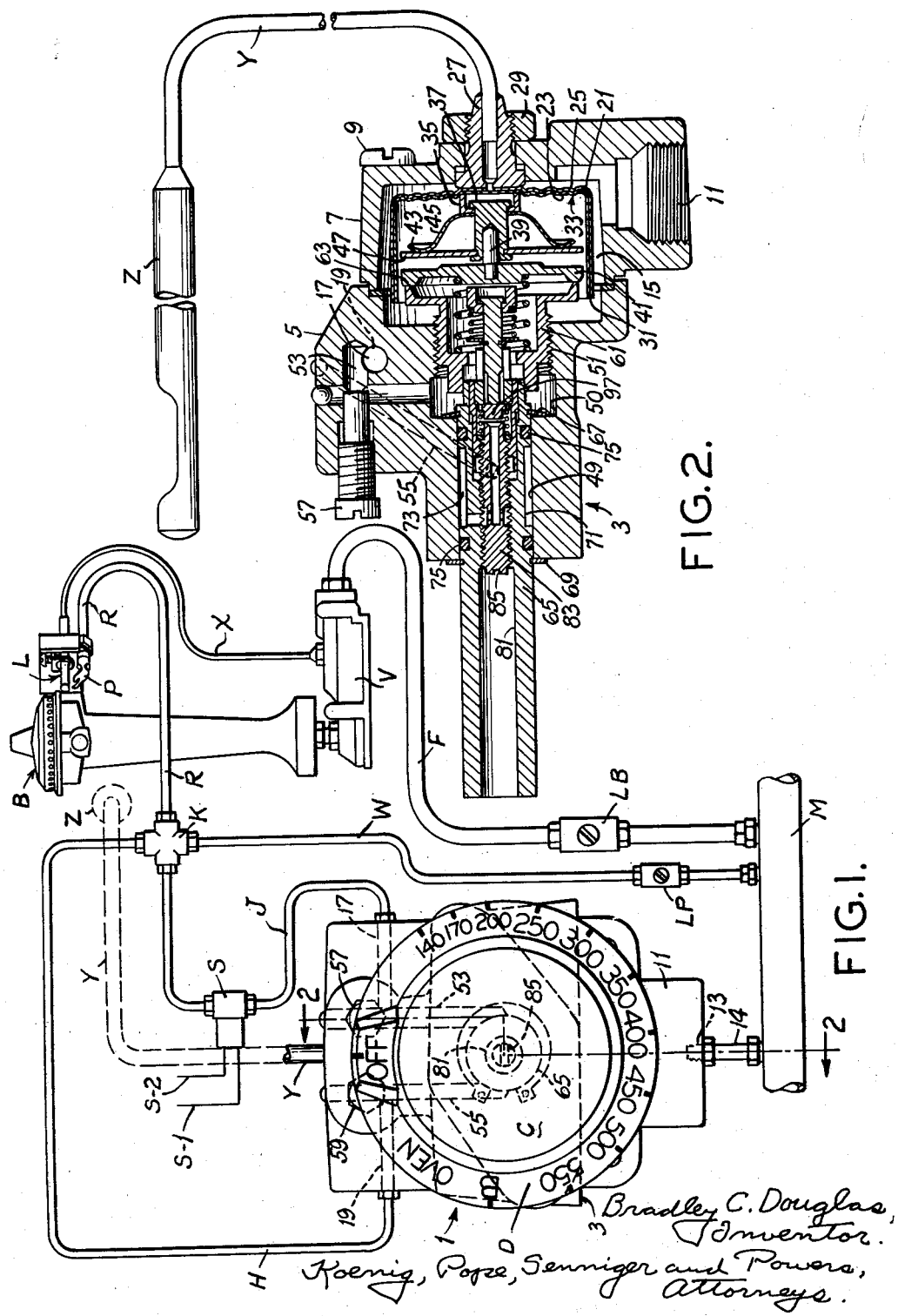

March 3, 1964

B. C. DOUGLAS 3,123,299

GAS REGULATOR SYSTEM

Filed March 5, 1962

B. C. DOUGLAS 3,123,299

GAS REGULATOR SYSTEM

Filed March 5, 1962

United States Patent Office

3,123,299
Patented Mar. 3, 1964

3,123,299
GAS REGULATOR SYSTEM
Bradley C. Douglas, Kirkwood, Mo., assignor, by mesne assignments, to Micro Controls, Inc., St. Louis, Mo., a corporation of Missouri
Filed Mar. 5, 1962, Ser. No. 177,512
20 Claims. (Cl. 236—68)

This invention relates to a gas regulator system and gas regulating apparatus for oven cooking ranges and the like, and more particularly to a thermostatic gas valve for adjustably controlling the intensity of a pilot burner flame which in turn controls the operation of means for supplying gas to a main burner.

Among the several objects of the invention may be noted the provision of gas regulating system and apparatus which will program a gas heating cycle wherein accurate regulation is obtained throughout both low- and high-temperature ranges according to various desired sequences, wherein the low range is useful, for example, for food warming, defrosting and the like; the provision of apparatus of the class described wherein a wide variety of sequences may be obtained in the succession of low- and high-range control; the provision of apparatus of the class described adapted to provide sequences in which a low-temperature range may occur before a high-temperature range, one in which a high-temperature range may occur before a low-temperature range, and one in which a low-temperature range may precede a high-temperature range and another low-temperature range succeed said high-temperature range; the provision of apparatus of the class described which can be programmed to provide high-temperature range operation or low-temperature range operation; and the provision of such apparatus having a thermostatic gas valve which accomplishes regulation over high- and low-temperature ranges by means of comparatively low-cost parts. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are illustrated, FIG. 1 is a view illustrating one embodiment of the invention, shown in an off position;

FIG. 1A is a systematic flow diagram of various parts shown in FIG. 1 and in the succeeding figures;

FIG. 2 is an axial section of a valve component, the section being taken on line 2—2 of FIG. 1, some parts being omitted for clarity, parts being shown in an off position;

Corresponding reference characters indicate corresponding parts throughout the several views of the drawings.

Figure 1B:
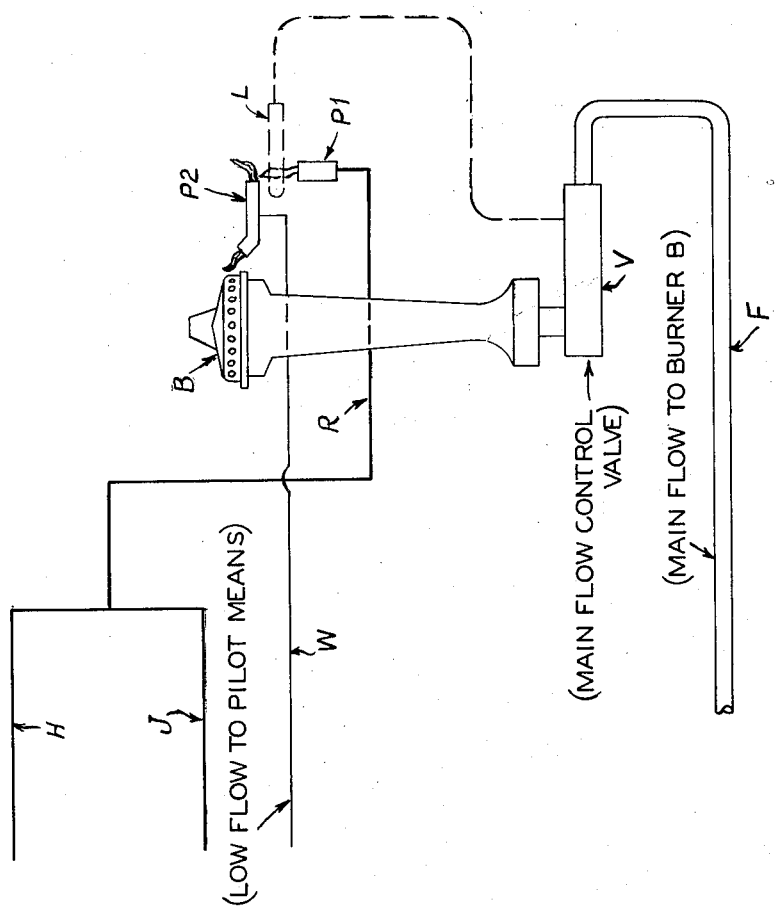
FIG. 1B is a fragmentary view similar to 1A, but showing a modification.

Although the invention described herein has general use, a particular use is for thermostatic gas valve systems for oven temperature control, in relation to which an oven will be described as an example. The gas regulating apparatus is shown generally in FIGS. 1 and 1A. In these figures, P is a constantly burning pilot burner means adapted to receive a small amount of gas from a main gas supply line M over a low-flow line W, a fitting K (FIG. 1) and a line R. An adjustable low-flow limit valve LP in line W controls the amount of gas passing to pilot burner means P. Pilot burner means P serves to ignite the oven burner B when gas is supplied to the latter.

Device L is a known fluid-fill type of temperature-responsive thermostatic element and is located in heat-exchange relationship with pilot burner means P. Device L controls a known type of main-flow control valve V through a fluid line, such as shown in commonly assigned copending U.S. application Serial No. 65,091, filed October 26, 1960, entitled Regulators for Gas Burners and issued as Patent No. 3,065,913. Upon being heated to a predetermined temperature, thermostatic element L will cause valve V to open and permit gas to flow from the main supply line M over a main-flow line F and into burner B from valve V. An adjustable main-flow limit valve LB controls the maximum amount of gas that may pass through line F to burner B. However, a small amount of gas constantly supplied to pilot burner means P over line W is not enough to create a flame of sufficient intensity to raise the temperature of thermostatic element L to the predetermined temperature. It is only when an additional amount of gas is permitted to pass to pilot burner means P that its flame reaches such an intensity that device L will cause valve V to open.

As seen in the systematic flow diagram in FIG. 1A, this additional amount of gas is supplied to pilot burner means P over an auxiliary flow line 14 which includes a thermostatic gas valve 1, passage 15 and parallel line or leg portions H and J. An auxiliary thermostatic valve 41, 63 (FIG. 1A), to be described below, controls the flow of gas through both legs H and J for full range heating. Auxiliary thermostatic valve 41, 63 is controlled by a fluid-filled temperature-responsive bulb Z connected to the auxiliary thermostatic valve 41, 63 by a line Y. Bulb Z is located in the space to be heated, as, for example, the oven of a cooking range which is heated by burner B. A control dial D (FIG. 1) and a solenoid operated cut-off or timing valve S (FIGS. 1 and 2) in line J serve control and programming purposes, to be made clear. Solenoid operated cut-off valve S is connected by wires S–1 and S–2 to a suitable control mechanism (not shown), such as an electric timer, which could be made to excite and de-excite the solenoid of valve S, thus to open or close valve S as desired. A limited-temperature-range control valve 95, 97 (FIG. 1A), to be described later, is located in line H and is thermostatically operated by the auxiliary thermostatic valve 41, 63 to control the flow of gas through line H in a limited-low-temperature range.

With the above system, assuming that the auxiliary thermostatic valve 41, 63 is open, the heating rate of the pilot burner means P may be varied either in response to the thermostatically operated auxiliary valve 41, 63 when the cut-off valve S in line J is open, or in response to the control valve 95, 97 in line H when the cut-off valve S in line J is in a cut-off position. It will be apparent that, during high-temperature heating, auxiliary gas flows through line or leg J to pilot burner means P, while during low-temperature heating, auxiliary gas may flow through line H to pilot burner means P if timing valve S is closed. Thus closing of timing valve S shifts the gas flow control from control valve 41, 63 to control valve 95, 97. The low temperature heating may be utilized in several ways; for example, it may be utilized for defrosting a frozen product, keeping warm a product which has already been cooked at a higher temperature, or simply simmering a food at a low temperature.

FIG. 1B illustrates a modification in the pilot burner means, which, however, has no effect on the operational features of the auxiliary flow of gas to the pilot burner means. In the modification, the pilot burner means includes a normally extinguished pilot burner P1 connected to lines H and J by line R, and a constantly burning second pilot burner P2 connected to main gas supply line M by low-flow line W. Pilot burner P2 has two flames issuing therefrom, one of which is adapted to ignite gas issuing from main burner B and the other of which is adapted to ignite gas issuing from pilot burner P1. Thermostatic element L is so located that it will be heated to its predetermined operating temperature by a flame issuing from pilot burner P1, but not by the flame issuing from pilot burner P2. Considering P1 and P2 to be pilot burner means, the constant flame from P2 may be referred to as a low-intensity component of pilot means composed of P1 and P2, particularly in reference to element L.

In FIG. 1B, thermostatic element L will be heated to its operating temperature only when gas is supplied to pilot burner P1 through either or both auxiliary legs H and J, and line R. It will be seen that in both the pilot means P in FIG. 1A and the pilot means (P1 and P2) in FIG. 1B, a small amount of gas is constantly supplied over low-flow line W. Thus a low-intensity flame is constantly issuing from the pilot burner means from P (FIG. 1A) or P2 (FIG. 1B). An additional amount of gas is adapted to be supplied to P (FIG. 1A) or P1 (FIG. 1B). This occurs over the auxiliary flow line 14 which serves valves 41, 63 and 95, 97, parallel lines H and J and line R, so that a pilot flame may be created in each case which will heat element L to a degree that it will open valve V. In the case of P, the flame is increased for the purpose, and in case of P1, P2 a sufficient flame is initiated at P1 for the purpose.

The timer for the solenoid cut-off valve S and the dial D may be located on the control panels of the range which the apparatus serves.

Figure 3:
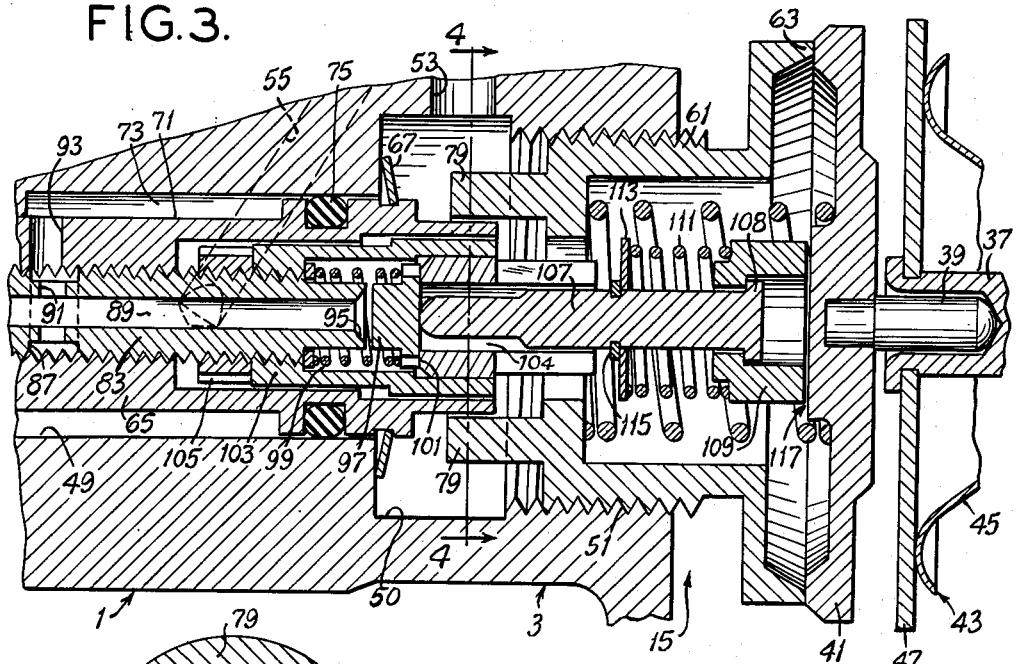
FIG. 3 is an enlarged view of certain parts of FIG. 2, parts being shown in an off position.

Referring now to FIGS. 2 and 3, valve 1 comprises a body 3 formed of parts 5 and 7 which are held together by screws such as 9. At numeral 11 is shown a gas inlet into which an inlet fitting 13 (FIG. 1) is threaded. Inlet fitting 13 and auxiliary flow pipe 14 connect inlet 11 with the main gas line M. Parts 5 and 7 form a gas chamber 15 with which inlet 11 is in communication. A first outlet port 17 is connected to line J and a second outlet port 19 is connected to line H.

A double-walled cup 21 (FIG. 2) is located in chamber 15. Cup 21 has an inside wall 23 and an outside wall 25, the latter being soldered or otherwise attached to the end of a nipple and post 27, held by means of a nut 29 in an opening in member 7. The marginal portions 31 of the cup members 23 and 25 are sealed together as by welding or soldering, the remaining portions of the members 23 and 25 being unjoined. Both walls are corrugated in their portions forming the inside bottom 33 of cup 21. The outside member 25 communicates through the nipple 27 with line Y, which as previously stated is connected to bulb Z.

The bulb Z, line Y and available space between the bimetallic members 23 and 25 are filled with a thermally responsive liquid which is adapted on expansion in response to heating to enter between the members 23 and 25, so as to force them apart. This drives the bottom member 25 to the left away from bottom 23. The inner bottom 23 carries an attached support member 35 which has a sliding engagement with a supported member 37 in which is carried a stem 39 of an auxiliary movable valve member 41. A spring rosette 43 is attached centrally to sleeve 35. Its central portion and member 35 slide on supported member 37. Spring fingers 45 of the spring rosette 43 contact and press marginally against a plate 47 riveted to the end of supported member 37.

The remaining internal parts of valve 1 will be best seen in FIG. 3. Body 3 is provided with a passage 49 extending from the outside to the chamber 15. The inner end of passage 49 is counter-bored as at 50 and threaded as indicated at 51. The counter-bore 50 is in communication with outlet port 17 by means of a port 53 (FIGS. 1, 2 and 3). Passage 49 is also in communication with outlet port 19 by a port 55 (shown in dotted lines). The size of the opening between port 53 and port 17 and between port 55 and port 19 is under control of adjustable threaded control valves 57 and 59 (FIGS. 1 and 2), respectively, threaded into part 5.

Figure 4:
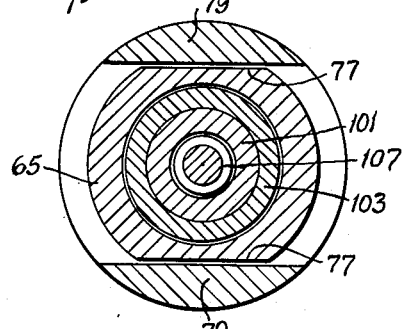
FIG. 4 is a section taken on line 4—4 of FIG. 3, some parts being omitted for clarity.

Threaded within passage 49 is a tubular member 61 having an auxiliary valve seat 63 on its inner end. Mounted in passage 49 is a tubular control member 65. Member 65 is constrained against axial movement within passage 49 by retainer rings 67 and 69 (FIG. 2). Member 65 is also grooved at 71 so that the member and part 5 cooperate to form an annular passage 73. Packing rings 75 are provided between groove 71 and retainers 67 and 69 to close passage 73. The inner end of member 65 is provided with two flat surfaces 77 (FIG. 4) which are aligned with flat surfaces of projections 79 on member 61. Thus rotation of member 65 will rotate member 61 while permitting relative axial movement therebetween. Port 53 is always in commuaniaction with the interior of member 61 through the space between the projections 79.

Member 65 is provided with a passage 81 into which is threaded a stem 83. Stem 83 has a screwdriver control slot 85 (FIG. 2) on its outer end for adjustment purposes. Stem 83 and member 65 cooperate to form an annular passage 87 surrounding the stem 83. Stem 83 is provided with an elongate cavity 89 which is open at the inner end of the stem. A port 91 connects the cavity 89 with passage 87 and a port 93 connects passage 87 with passage 73. The inner open end of stem 83 is provided with a limited range valve seat member 95, which may be referred to as the rear seat member.

A limited range valve member 97 is adapted to be seated on rear seat member 95 and is biased therefrom by a spring 99 toward a valve seat member 101, which may be referred to as a front seat member. Front seat member 101 is mounted in the inner end of a retainer 103 threaded on stem 83. This member has a passage 104 extending therethrough. A lock nut 105 maintains retainer 103 and its seat member 101 in a fixed position relative to stem 83, including its rear seat portion 95. The distance between rear seat member 95 and front seat member 101 is slightly greater (for example, .005 inch) than the axial thickness of valve member 97.

A pin 107 is slidably mounted within front seat member 101. This pin is flanged at its forward end as shown at 108 and for overtravel has a sliding engagement with a pin retainer 109. Pin 107 and retainer 109 are held together as a unit by an expansive spring 111, located between retainer 109 and a washer 113 surrounding pin 107. Washer 113 is held in place on pin 107 by a retaining ring 115. The forward end of retainer 109 is spaced slightly from valve member 41 when the oven is at room temperature, i.e., when the auxiliary seat member 63 is in the forward position shown in FIG. 3, the spacing being shown at 117 (FIG. 3).

The dial D (FIG. 1) is positioned on the outer end of member 65. This dial is of the type which has temperature markings indicating oven temperature ranging, for example, from 140° F. to somewhat over 550° F. A removable cap C is mounted on the face of the dial D within the temperature markings.

As previously mentioned, the solenoid operated cut-off or timing valve S is adapted to be controlled by a conventional electric timer (not shown). Any of various different types of electric control clocks or mechanisms can be utilized and can be set to open and close timing valve S at various times, depending on the desired sequence of heating cycles; or the control may be manually effected. Thus the heating cycles can be programmed or sequenced as desired. The following examples illustrate several different heating programs that may be desired. It will be assumed in these examples that the stem 83 is positioned within tubular member 65 to obtain an average low temperature of 140° F., although the time delay of the operation of the various thermostatically operated parts may cause the oven temperature to vary ±20° F. from 140° F. The method of changing or recalibrating the stem 83 to obtain a desired particular low-temperature setting will be made apparent later.

I

Consider first the simplest case, wherein a woman wishes to cook a roast for a period of two hours at 500° F., after which time she intends immediately to remove the roast. With the oven cold and dial D turned to off position, the position of the parts of the valve 1 are as shown in FIG. 3. Thus, the gas which comes into the inlet 11 is retained within the gas chamber 15, auxiliary valve member 41 being closed on auxiliary valve seat 63. Cut-off valve S is open. The dial D is moved counterclockwise to bring the 500° F. mark to the top of the dial. This causes member 65 to rotate, thereby rotating member 61 (see FIG. 4), which backs off to its position shown in FIG. 5. However, since the member 65 has not moved axially, the stem 83, limited range valve member 97, front seat 101, pin 107 and retainer 109 will not have been moved axially. Gas will then flow from chamber 15 through member 61 into port 53, as shown by darts A in FIG. 5. It then proceeds through passages 53, 17, line J, cut-off valve S, fitting K, and line R to pilot burner means P. This causes the flame issuing from pilot burner means P to reach a greater intensity than the flame normally issued from the pilot burner means. This high-intensity flame heats thermostatic element L to the predetermined temperature necessary for its operation to open main-flow control valve V. Thus gas flows through main-flow line F and valve V into the main burner B where it is ignited by the flame issuing from pilot burner means P.

As the oven temperature increases from room temperature toward 500° F., the liquid within bulb Z, through its expansion, causes the inside cup member 23 and parts 35, 37 and 39 to be moved to the left thereby pushing auxiliary valve member 41 toward seat 63. As the temperature in the oven reaches 120° F., for example, auxiliary valve member 41 contacts the adjacent face of retainer 109. As the temperature in the oven increases from 120° F. to 140° F., for example, valve member 41 pushes retainer 109 to the left a short distance, thereby causing the pin 107 to push limited range valve member 97 from the front seat 101 to rear seat 95.

Figure 6:
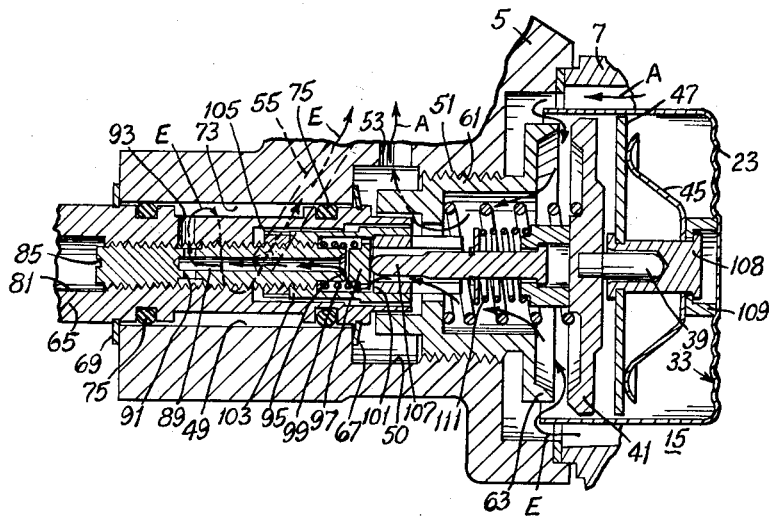

FIG. 6 shows limited range valve member 97 in progress as it moves from front seat 101 to rear seat 95. During this short period, gas, in addition to the gas flowing through port 53, will also flow through the passage in the front valve seat member 101, around limited range valve member 97, into cavity 89, through port 91, annular passage 87, port 93, annular passage 73, and port 55, as shown by darts E (FIG. 6), outlet port 19, leg portion or line H fitting K and line R to pilot burner means P. Pilot burner means P is then receiving gas via fitting K from three sources, viz., low-flow line W, outlet port 17 via leg J containing cut-off valve S, and outlet port 19 via leg H. This causes the flame intensity from pilot burner means P to increase slightly, but this does not substantially affect the operation of thermostatic element L. When the limited valve member 97 becomes seated on rear seat member 95, the flow of gas (darts E) through port 55, outlet port 19 and leg H is cut off. This will occur when the oven temperature reaches 140° F., for example. However since gas is still flowing through port 53, outlet port 17 and leg J (darts A), the flame issuing from pilot burner means P is of sufficient intensity to maintain thermostatic element L at its predetermined temperature.

Figure 7:
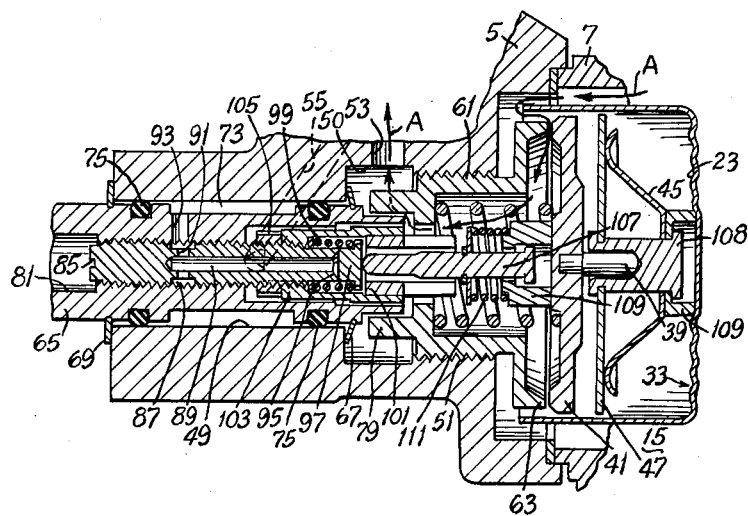

As the oven temperature increases from 140° F., for example, up toward the desired 500° F., the limited range valve member 97 remains seated on rear valve seat member 95, and the continuous leftward movement of the auxiliary valve member 41 causes an overriding action between retainer 109 and pin 107. This is shown in FIG. 7. The gas flow through the tubular member 61 and port 53 continues during this temperature rise. FIG. 7 illustrates the position of the parts just before the auxiliary valve member 41 reaches seat 63 and when the temperature in the oven is rising through 480° F., for example. When the temperature in the oven reaches 500° F., for example, auxiliary valve member 41 will contact seat 63 and close off the flow of gas (darts A) through port 53 and outlet port 17 to the pilot burner means P. This causes the flame issuing from pilot burner means P to be diminished, and the only gas supplied to pilot burner means P emanates from main gas line M, via low-flow line W, fitting K and the line R. This diminished flame is not sufficient to keep the thermostatic element L at its predetermined temperature, and the temperature of the element quickly decreases, thereby causing main-flow control valve V to close. Main burner B is thereby extinguished.

As the oven temperature incipiently cools below 500° F. to 480° F., for example, auxiliary valve member 41 moves to the right to the position shown in FIG. 7, thereby permitting gas to flow back through the tubular member 61, port 53 and the outlet port 17 to pilot burner means P. The flame from burner means P then increases in intensity and thermostatic element L, upon being heated to the predetermined temperature, will open main-flow control valve V, thereby permitting gas to flow into burner B where it is ignited from the flame issuing from pilot burner means P. This again raises the temperature toward the 500° F. value. It is to be noted that even though the auxiliary valve member 41 moves slightly to the right to permit the gas to flow through port 53, it is not moved far enough to the right to permit the limited range valve member 97 to become unseated from rear seat member 95. The apparatus continues to cycle in this fashion and to maintain the temperature in the oven at approximately 500° F.

When desired, as for example at the end of two hours, the woman may turn the dial D clockwise (back) to the off position. This screws the threaded tubular member 61 to the right and causes the valve seat 63 to engage auxiliary valve member 41, thereby cutting off all flow of gas through the valve 1. The flame of pilot burner means P will then diminish and cause the temperature of the thermostatic element L to be lowered to a value at which it causes closing of valve V, thereby shutting off the gas to the burner B.

II

Consider secondly the situation wherein a woman wishes to cook a roast at a temperature of 500° F. for a period of two hours, after which cooking period she wishes the roast automatically to be kept warm, say at 140° F., until she has time to remove it from the oven. This situation might occur if she should find that she must be absent from her house during the three hours immediately preceding the time she has planned to have dinner.

Assume that she wishes to have dinner at 6:00 p.m., but finds that she will have to be out of the house from 3:00 p.m., until 6:00 p.m. At any time convenient to her, for example at 2:00 p.m., she puts the roast in the oven. The control mechanism for the cut-off or timing valve S will be set to cause the cut-off valve S initially to be open and to close at 4:00 p.m. Next, she turns the oven dial to the 500° F. mark. This will put the internal parts of the valve 1 in the position shown in FIG. 5. The main burner B will be ignited and the oven temperature will begin to increase. The various parts within valve 1 will pass through the positions thereof as shown in FIG. 6 during the time that the oven temperature increases from 120° F. to 140° F., for example. As the temperature in the oven approaches 500° F., the parts in the vlave 1 will be in the positions shown in FIG. 7. The oven temperature is then maintained at approximately 500° F. (in the manner previously described) for a period of two hours, at which time, it then being 4:00 p.m., cut-off or timing valve S will be actuated by the control mechanism to close line J. Thus the flow of gas to the pilot burner means P through line J is cut off and the flame issuing from pilot burner means P diminishes to the point where the thermostatic element L begins to cool.

Upon cooling a predetermined amount, thermostatic element L will cause main-flow control valve V to close, thereby cutting off the supply of gas to main burner B. As the temperature in the oven continues to drop, auxiliary valve member 41 moves to the right from the FIG. 7 position back toward its FIG. 6 position. As the temperature in the oven reaches approximately 140° F., auxiliary valve member 41 has moved to the right enough to permit spring 99 to force limited range valve member 97, pin 107 and retainer 109 to the right, thereby causing limited range valve member 97 to become unseated from rear seat 95. Gas is then permitted to flow through the interior of front valve seat member 101 around limited range valve member 97, through cavity 89, port 91, passage 87, port 93, passage 73 and port 55 as shown by darts E in FIG. 6, outlet port 17 and line H to the pilot burner means P.

During the cooling period, the temperature of the oven may undershoot to 120° F. or so. Then as the flame issuing from pilot burner means P increases, the thermostatic element L is heated to its predetermined actuating temperature, causing the main-flow control valve V to open and gas to be supplied to the main burner B. The gas issuing from main burner B is ignited by the pilot flame and the oven temperature begins to increase from the undershot value of 120° F. This causes auxiliary valve member 41 to be moved to the left as viewed in FIG. 6 and the limited range valve member 97 thereby becomes seated on rear seat member 95, closing cavity 89. Gas flow through outlet 19 is stopped and the flame issuing from pilot burner means P diminishes, causing thermostatict element L to cool and close main-flow control valve V.

The temperature within the oven may overshoot to approximately 160° F., for example, due to the delay before thermostatic element L has cooled sufficiently to close main-flow control valve V. As the temperature begins to diminish through 140° F., auxiliary valve member 41 is again moved to the right a small amount, thereby causing the limited range valve member 97 to become unseated from the rear seat 95 and gas to flow through outlet 19 to the pilot burner means P. The oven is then maintained at approximately the 140° F. warming temperature, i.e., in the 120° F.–160° F. range. This is due to the continuous opening and closing of cavity 89 by limited range valve member 97. The oven will be maintained at this low temperature until the woman, who arrives home at 6:00 p.m., turns the dial D back to its off position, thereby forcing seat 63 against auxiliary valve member 41 and shutting off the gas flow through valve 1. She may then remove the cooked and still-warm roast from the oven.

III

Next, consider the situation wherein a woman wishes to cook a roast for two hours at 500° F. and is faced with the fact that the roast is frozen and that she will be absent for five hours. Assume she is planning to leave the house at noon and wishes the roast to be done at 4:00 p.m., although she may not return to her house until later, say, 4:30 p.m. or 5:00 p.m.

First, she places the frozen roast in the oven and sets the timing valve control mechanism to cause the timing valve S to be initially closed, to be opened at 1:30 p.m., to be closed again at 1:34 p.m., to be opened again at 2:00 p.m., and to be closed again at 4:00 p.m. The purpose of the opening and closing of timing valve S at these times will become apparent as hereinafter explained. The dial D is then turned counterclockwise approximately to bring the 500° F. mark to the top of the dial. The woman may leave the house at this time.

Figure 5:
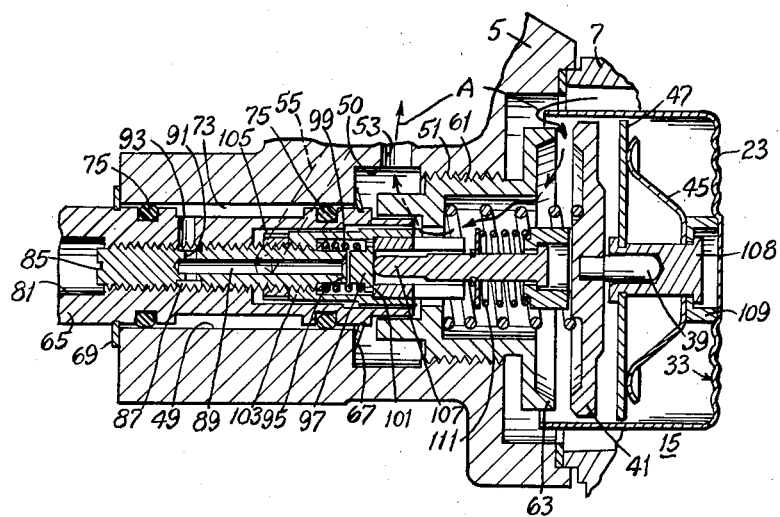
FIGS. 5–8 are fragmentary sectional views of the valve, such as shown in FIG. 3 but on a reduced scale and showing the positions of parts and gas flow paths during the various stages of a cooking cycle.

When the dial is turned to 500° F., the parts of the valve 1 assume the position shown in FIG. 5. Gas will be permitted initially to flow through the member 61, port 53, and outlet port 17 into line J (see darts A). However, since the timing or cut-off valve S is initially closed, this gas cannot proceed to the pilot burner means P. Hence, the flame issuing from pilot burner means P remains at a low intensity and thermostatic element L is not heated to its predetermined temperature.

At 1:30 p.m., cut-off valve S is opened, thus permitting the gas to be fed to pilot burner means P and, as described previously, the main burner to become ignited. It takes approximately three to four minutes before the oven temperature reaches 140° F., for example. During the last half minute or so of this initial three- to four-minute period, the parts are in the position shown in FIG. 6 and gas is permitted to flow (darts A and E) through both outlets 17 and 19. However, at the end of this four-minute period, it then being 1:34 p.m., the cut-off valve S is again closed, so that only gas passing through port 55 (darts E), outlet port 19 and line H passes through the valve 1 to the pilot burner means P. The cut-off valve S will then be maintained closed until 2:00 p.m., during which time the oven temperature will be maintained at approximately 140° F. This temperature causes the roast to be defrosted.

At 2:00 p.m., the cut-off valve S is opened. The oven temperature will then be increased up to its 500° F. mark, even though the limited range valve member 97 will have seated (above the 140° F. temperature) on rear seat member 95, because gas can now flow through port 53, outlet port 17, and line J to the pilot burner means P (darts A). The parts will then assume the position shown in FIG. 7 as the temperature nears the 500° F. mark. The temperature then is maintained at approximately 500° F. until 4:00 p.m., at which time the timing valve S is again reclosed. The oven temperature then decreases to approximately 140° F., at which time the limited range valve member 97 becomes unseated from rear seat member 95 and gas is permitted to flow out port 19 and through line H (darts E, FIG. 6) to the pilot burner means P, which causes the burner B to be supplied with gas and reignited. The temperature is maintained in this 120° F.–160° F. range (averaging approximately 140° F.) by the cycling action of limited range valve member 97 until the woman returns home, say at 4:45 p.m., and turns off the dial D, thereby causing the seat 63 to become engaged with auxiliary valve member 41. She may then remove the roast from the oven in its warm condition.

IV

Consider next the situation wherein a woman is cooking a roast at 500° F. and desires to turn the oven down to 140° F., for example, to keep the roast warm. This situation would occur when she has already cooked the roast and it is time to remove it from the oven but she finds that dinner will be delayed for an hour for some unexpected reason. In this situation she merely turns the dial from the 500° F. mark to the 140° F. mark. This will cause member 63 to be moved from the FIG. 7 position toward the right against auxiliary valve member 41, thus pushing the valve member 41 to the right. When the temperature in the oven drops to approximately 140° F., the auxiliary valve member 41 will unseat from seat 63. Gas will then flow through the member 61, port 53, outlet port 17 and line J (darts A) to the pilot, where the flame increases and the burner B is subsequently ignited.

During the time before burner B is ignited, the oven temperature may undershoot to 120° F. or so. When the temperature in the oven increases to 140° F., the auxiliary valve member 41 will become seated on the seat 63 and the gas to pilot burner means P will be shut off, thereby causing the burner B to become extinguished. It is insignificant that, during this opening and closing movement of auxiliary valve member 41 on seat 63, the limited range valve member 97 is also caused to move so as to permit gas to flow through the cavity 89 and ports 55 and 19, through line H to the pilot P (darts E). This is because the limited range valve member 97 only permits gas to pass thereby when the auxiliary valve member 41 and the seat 63 are separated. Stated in another way, the auxiliary valve member 41 and seat 63 determine whether or not any gas will be passing through the valve 1 to the pilot P, regardless of the movement of limited valve member 97. At 7:00 p.m., or whenever the woman wishes to have dinner, she merely turns the dial D to its off position, causing the seat 63 to become engaged with auxiliary valve member 41. She may then remove the roast from the oven in its warm condition.

V

Figure 8:
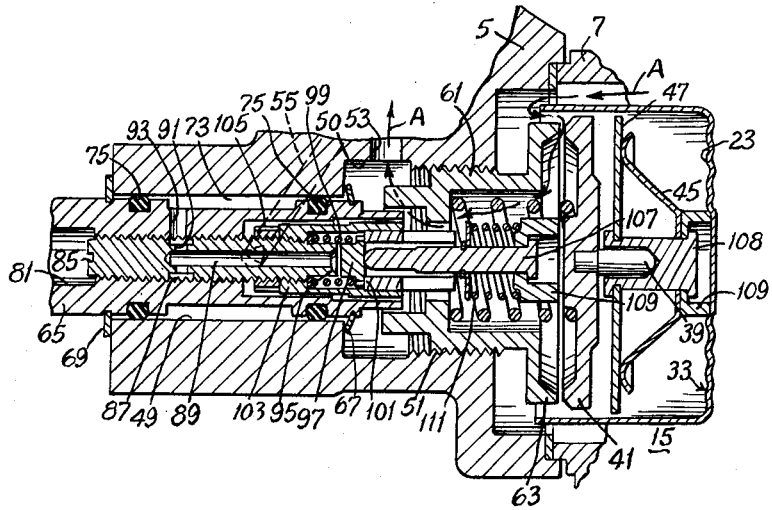

Consider next the situation wherein the woman wishes to cook or warm a roast at approximately 140° F. Assuming that the oven is cold, she will turn the dial D from 0 up to the 140° F. mark. This causes the parts within valve 1 to assume the position shown in FIG. 8. Gas will then follow the path shown by the darts A in FIG. 8 through port 53 and outlet port 17 to the pilot burner means P which, as previously stated, causes the burner B to be supplied with gas and ignites the gas issuing from the burner B. As the temperature in the oven reaches 140° F., auxiliary valve member 41 will seat on seat 63, thereby cutting off the flow of gas to the pilot P. The temperature is then maintained at approximately 140° F. by the movement of auxiliary valve member 41 with respect to the seat 63.

It also will be noted in this situation that the limited range valve member 97 may be moved so that gas may flow therearound. However, since the auxiliary valve member 41 actually becomes seated and then unseated with the seat 63, the gas that flows around the limited range valve member 97 is of little significance. When the woman believes the roast is cooked or warmed enough at approxiamtely 140° F., she turns the dial D to the off position, thereby causing seat 63 to engage auxiliary valve member 41 and gas flow to the pilot P through the valve 1 to be cut off.

Figure 10:
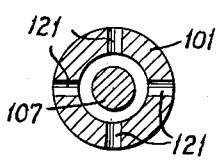
FIG. 10 is a detail section taken on line 10—10 of FIG. 9, some parts being omitted for clarity.
Figure 9:
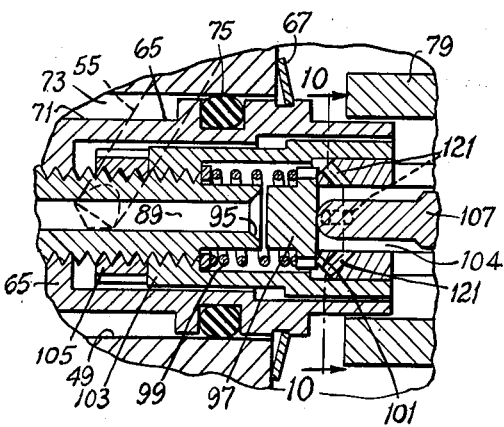
FIG. 9 is an enlarged fragmentary view of a modification of the gas valve illustrated in FIGS. 2–8.

FIGS. 9 and 10 show a valve construction which is slightly modified from the valve shown in FIGS. 1–8. This involves providing ports 121 in the front seat member 101. These ports connect the passage within front valve seat member 101 to the cavity 89 around the limited range valve member 97. Thus under conditions in which the oven temperature is less than 140° F., for example, and the spring 99 holds limited range valve member 97 against front seat 101, the cavity 89 is connected through the ports 121 and the passage within front seat member 101 with the interior of tubular member 61.

With this modified thermostatic gas valve a woman can cook a roast, for example, at 140° F. for two hours, after which time she can have the apparatus programed to cook the roast at 500° F. for another hour and a half, for example. After the roast has cooked for an hour and a half at 500° F., she may then desire that the oven temperature be reduced to the 140° F. range until she turns off the oven. The woman will first set the timing valve control mechanism to maintain timing valve S closed for two hours, then open for one and one-half hours, and then closed again. She then turns the oven dial up to 500° F. This backs off member 61 away from auxiliary valve member 41 to the position shown in FIG. 5. Gas cannot flow through the port 53 and outlet port 17 through line J because the cut-off valve S is closed. However, gas can flow around the limited range valve member 97 by means of the ports 121. This gas passes through the cavity 89 to the outlet port 19, and then through gas line H to the pilot burner means P. Thus the pilot receives an extra amount of gas and increases its flame, whereby the main burner B subsequently receives gas. This gas is ignited by the pilot burner means P.

When the oven temperature increases to 140° F., the valve member 41 moves to the left and causes the limited range valve member 97 to become seated on rear seat member 95, thus shutting off the gas through line H to the pilot burner means P. The oven temperature remains at approximately 140° F. for two hours as a result of the cycling action of limited range valve member 97. At the end of two hours the cut-off valve S is opened, thereby permitting gas to flow through the line J to the pilot burner means P. The oven temperature will then increase to approximately 500° F. This occurs even though the limited range valve member 97 becomes seated on rear seat 95, since the cut-off valve S is now open.

The oven temperature will remain at approximately 500° F. for an hour and a half as desired. At the end of this time the cut-off valve S again will be closed, thereby shutting off the gas through line J to pilot burner means P. When the oven temperature decreases to 140° F. and lower, the limited range valve member 97 becomes unseated from the rear seat 95, thereby permitting gas again to flow to the pilot. The oven temperature is then maintained at approximately 140° F. until the oven dial D is turned to the off position by the woman. The roast, which is warm, may then be removed from the oven.

The primary difference between the embodiment shown in FIGS. 1–8 and the embodiment shown in FIGS. 9 and 10 is that in the latter gas is not required to pass first through line J to obtain oven temperature control in the low-temperature (140° F.) range as required in the embodiment shown in FIGS. 1–8.

It is to be noted that the gas valve 1 is provided with means by which the temperature in the low range may be conveniently and simply recalibrated, should it become out of adjustment. This recalibration is made possible by the fact that stem 83 is threaded within member 65. By moving the stem 83, which means moving the valve seats 95 and 101, relative to the tubular member 61 and its seat 63, the temperature at which the limited range valve member 97 will move from one of the seats 95 or 101 to the other seat may be varied. For example, if the stem 83 were moved to the left relative to members 65 and 61 as viewed in FIG. 3, the temperature at which the limited range valve member 97 would be unseated from front seat 101 would be increased. This is because pin 107 will not engage limited range valve member 97 until valve member 41 (which is under control of the oven temperature) has moved farther to the left than previously necessary. However, while the stem 83 is shown as being threaded within member 65 for adjusting the position of valve seats 95 and 101 relative to the members 65 and 61, it is to be understood that the stem 83 and member 65 could be integrally formed as one part or at least rigidly joined together without altering the effectiveness of the thermostatic gas valve. It would mean only that there would be no adjustment of this low-temperature setting.

While the above examples of cooking programs have been based on the form of FIG. 1A, they apply also to the form of FIG. 1B. This will be apparent when it is noted that the thermostatic element L at a comparatively low temperature thereof (either cold or simply warm) permits valve V to close, and at a comparatively high temperature thereof opens valve V. In other words, when a low temperature occurs in L (low flame from P in FIG. 1A; or flame only from P2 and no flame from P1 in FIG. 1B) then valve V is closed. On the other hand, when a higher flame from P in FIG. 1A, or flame from P1 as well as flame from P2 in FIG. 1B occurs, thus heating L to a higher temperature, valve V will be open. Thus the term pilot burner means is to be construed herein as a device such as P in FIG. 1A or such as P1, P2 in FIG. 1B. The important feature in each case is that the pilot burner means is designed to change the temperature of L from one in which the valve V is closed to a higher one in which valve V is open. In each case, to close V there is a normally low-intensity flame issuing from the pilot burner means (from P in FIG. 1A or from P2 of P1, P2 in FIG. 1B). In each case to open V there is a flame of greater intensity issuing from the pilot burner means (from P in FIG. 1A or from P1 and P2 of P1, P2 in FIG. 1B).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A gas regulator system comprising a main burner, pilot burner means associated therewith, a main burner valve, thermostatic means adapted in response to the temperature produced by an ignited low flow of gas from the pilot burner means to close said valve and in response to the temperature produced by an ignited higher flow of gas from the pilot burner means to open said valve, a low-flow gas connection between the pilot burner means and a source of gas, auxiliary piping means connecting the pilot burner means with a source of gas, a first auxiliary thermostatic valve and a cut-off valve therefor controlling flow in a part of said auxiliary piping means, a second auxiliary thermostatic valve controlling flow in another part of the auxiliary piping means connected in parallel with said cut-off valve, means responsive to heat from the main burner adapted thermostatically to actuate said auxiliary valves, said first auxiliary valve when the cut-off valve is open being adapted to control auxiliary flow of gas to the pilot burner means throughout a comparatively wide range of temperatures, said second auxiliary valve when said cut-off valve closes being adapted to control auxiliary flow of gas to said pilot burner means throughout a smaller range of temperatures.

2. A gas regulator system comprising a main burner, pilot burner means associated therewith, a main burner valve, thermostatic means adapted in response to the temperature produced by an ignited low flow of gas from the pilot burner means to close said valve and in response to the temperature produced by an ignited higher flow of gas from the pilot burner means to open said valve, a low-flow gas connection between the pilot burner means and a source of gas, auxiliary piping means connecting the pilot burner means with a source of gas, said piping means including two parallel connections, a first auxiliary thermostatic valve and a cut-off valve therefor controlling flow in one of said parallel connections, a second auxiliary thermostatic valve controlling flow in the other parallel connection, means responsive to heat from the main burner adapted thermostatically to actuate said auxiliary valves, said first auxiliary valve when the cut-off valve is open being adapted to control auxiliary flow of gas to the pilot burner means throughout a comparatively wide range of temperatures, said second auxiliary valve when said cut-off valve closes being adapted to control auxiliary flow of gas to said pilot burner means throughout a smaller range of temperatures.

3. A gas regulator system for a pilot burner means associated with a main burner and with a thermostatically operated main burner valve adapted to increase and decrease the heating rate of said pilot burner means; comprising a low-flow gas line between the pilot burner means and a source of gas, an auxiliary gas flow line between said pilot burner means and a source of gas, said auxiliary flow line including parallel-connected first and second leg portions therein, a thermostatically operated auxiliary gas flow valve in the auxiliary flow line responsive to heat from the main burner and adapted to control flow through both of said first and second leg portions, a cut-off valve in said first leg portion, a control valve in said second leg portion adapted for control of heating in a limited temperature range, said control valve adapted to be thermostatically operated in connection with said thermostatically operated auxiliary gas flow valve when the latter is open, whereby the heating rate of said pilot burner means may be varied either in response to said thermostatically operated auxiliary gas flow valve at one temperature when said cut-off valve is open, or in response to said control valve at another temperature when said cut-off valve is in cut-off position.

4. A gas regulator system comprising a constantly burning pilot burner means having a low-intensity flame normally issuing therefrom, a main burner adapted to be ignited from said pilot burner means, a main-flow control valve controlling gas flow to the main burner, a thermostatic control means adapted in response to heat produced by a pilot flame of a greater intensity than the heat produced by the low-intensity pilot flame to open said main-flow control valve and to shut the same when the pilot flame is of a low intensity, a valve body having an inlet, first and second outlets connected with said pilot burner means, any gas passing through either or both outlets to said pilot burner means providing the pilot burner means with sufficient gas to produce a pilot flame of a greater intensity than the low-intensity flame, an auxiliary thermostatically controlled valve member controlling gas flow from the inlet through a first passage to the first outlet, a thermostatically controlled limited range valve member controlling gas flow from the inlet through a second passage to the second outlet, said limited range valve mmeber being adapted to permit gas to pass to said second outlet only when said auxiliary valve member is permitting gas to pass to said first outlet, and a cut-off valve adapted to control the flow of gas from the first outlet to said pilot burner means whereby gas flow through said outlets to said pilot burner means is under the control of said limited range valve member.

5. A gas regulator system comprising gas supply means, a constantly burning pilot burner means having a low-intensity flame normally issuing therefrom, a main burner adapted to be ignited from said pilot burner means, a main-flow control valve controlling gas flow to the main burner, a thermostatic control means adapted in response to heat produced by a pilot flame of a greater intensity than the heat produced by the low-intensity pilot flame to open said main-flow control valve and to shut said valve when the pilot flame is of a low intensity, a body having a gas chamber, an inlet connected to said gas supply means, first and second outlets connected with said pilot burner means, any gas passing through said outlets to said pilot burner means providing the pilot burner means with sufficient gas to produce a pilot flame of a greater intensity than the low-intensity flame, a passage in said body communicating with said gas chamber, a tubular member threaded into the passage, said tubular member having a first seat, control means rotatably mounted in the outer portion of the passage adapted upon rotation to rotate said tubular member, cavity means within said control means opening into the interior of said tubular member, a second seat located on said control means around said cavity means, a movable auxiliary valve member adapted for movement into engagement with the first seat, a movable limited range valve member adapted for movement into seating engagement with said second seat, means adapted to move said limited range valve member toward said second seat upon movement of said auxiliary valve member toward said first seat, first passage means connecting the interior of said tubular member with said first outlet, second passage means connecting said cavity means with said second outlet, and thermostatically controlled means adapted to move said auxiliary valve member toward said first seat, said limited range valve member being adapted to permit gas to pass to said second outlet only when said auxiliary valve member is permitting gas to pass to said first outlet, and a cut-off valve adapted to stop the flow of gas from the first outlet to said pilot burner means, whereby gas flow through said outlets to said pilot burner means is under the control of said limited range valve member.

6. A gas regulator system as set forth in claim 5 including a third seat located on said control means, and means biasing said limited range valve member toward said third seat.

7. A gas regulator system as set forth in claim 6 including means forming a passage connecting the interior of said tubular member with the cavity means.

8. A gas regulator system comprising gas supply means, pilot burner means, a valve housing having a gas chamber, an inlet connecting said gas chamber to said gas supply means, first and second outlets, a first gas line connecting said first outlet with said pilot burner means, a second gas line connecting said second outlet with said pilot burner means, a cut-off valve in said first line, a passage in said housing communicating with said gas chamber, a tubular member threaded into the passage, said tubular member having a first seat, control means rotatably mounted in the passage adapted upon rotation to turn said tubular member, cavity means within said control means opening into the interior of said tubular member, a second seat located on said control means around said cavity means, a movable auxiliary valve member adapted for movement into engagement with the first seat, a movable limited range valve member adapted for movement into seating engagement with said second seat, first passage means connecting the interior of said tubular member with said first outlet, second passage means connecting said cavity means with said second outlet, and thermostatically controlled means adapted to control the opening and closing movements of said valve members thereby to control the flow of gas to the first and second outlets, said cut-off valve controlling the flow of gas through said first line.

9. A thermostatic gas valve comprising a body having a gas chamber, an inlet into said gas chamber and in constant communication with the latter, first and second outlets, a passage in said body communicating with said gas chamber, a tubular member threaded into the passage, an auxiliary valve member adapted for movement into seating engagement with said tubular member, temperature responsive means for controlling the movement of said auxiliary valve member, control means rotatably mounted in the outer portion of the passage adapted upon rotation to turn said tubular member, cavity means within said control means opening into the interior of said tubular member, a seat on said control means around said cavity means, first passage means connecting the interior of said tubular member with said first outlet, second passage means connecting said cavity means with said second outlet, and a thermostatically controlled limited range valve member movable to and from said cavity means and having means adapted to engage with seat to block communication between the interior of said tubular member and said second outlet.

10. A thermostatic gas valve as set forth in claim 9 including another seat on said control means, and means biasing said limited range valve member toward said other seat.

11. A thermostatic gas valve as set forth in claim 10 including third passage means connecting the interior of said tubular member with the cavity means.

12. A thermostatic gas valve comprising a body having a gas chamber, an inlet into said gas chamber, first and second outlets, a passage in said body communicating with said gas chamber, a tubular member threaded into the passage, said tubular member having a first seat, control means rotatably mounted in the outer portion of the passage adapted upon rotation to turn said tubular member, cavity means within said control means opening into the interior of said tubular member, a second seat located on said control means around said cavity means, a movable auxiliary valve member in said gas chamber adapted for movement into engagement with the first seat to block communication between said inlet and said cavity means, a movable limited range valve member adapted for movement into seating engagement with said second seat, means adapted to move said limited range valve member toward said second seat upon movement of said auxiliary valve member toward said first seat, first passage means connecting the interior of said tubular member with said first outlet, second passage means connecting said cavity means with said second outlet, and thermostatically controlled means adapted to move said auxiliary valve member toward said first seat.

13. A thermostatic gas valve as set forth in claim 12 including a third seat located on said control means, and means biasing said limited range valve member toward said third seat.

14. A thermostatic gas valve as set forth in claim 13 including third passage means connecting the interior of said tubular member with the cavity means.

15. A thermostatic gas valve comprising a body having a gas chamber, an inlet into said gas chamber, first and second outlets, a passage in said body communicating with said gas chamber, a first tubular member threaded into the passage, an auxiliary valve member adapted for movement into seating engagement with said tubular member, temperature responsive means for controlling the movement of said auxiliary valve member, a second tubular member rotatably mounted in the outer portion of the passage adapted upon rotation to turn said first tubular member, a passage in said second tubular member, a stem threaded into the passage in said second tubular member, said stem having a cavity therein opening at the inner end of the stem into the interior of said first tubular member, a seat on the inner end of the stem, first passage means connecting the interior of said first tubular member with said first outlet, second passage means connecting said cavity with said second outlet, and a thermostatically controlled limited range valve member movable to and from said stem and having means adapted to be engaged with said seat.

16. A thermostatic gas valve as set forth in claim 15 including another seat for said limited range valve member, and means biasing said valve member toward said other seat.

17. A thermostatic gas valve as set forth in claim 16 including third passage means connecting the interior of said first tubular member with the cavity in said stem.

18. A thermostatic gas valve comprising a body having a gas chamber, first and second outlets, a passage in said body communicating with said gas chamber, a first tubular member threaded into the passage, said first tubular member having a first seat, a second tubular member rotatably mounted in the outer portion of the passage adapted upon rotation to rotate said first tubular member, a stem threaded into said second tubular member, said stem having a cavity therein opening at the inner end of the stem, a second seat located on the inner end of the stem, a movable auxiliary valve member adapted for movement into seating engagement with said first seat, a movable limited range valve member adapted for movement into seating engagement with the second seat, means adapted to move said limited range valve member toward the second seat on said stem upon movement of said auxiliary valve member toward said first seat, first passage means connecting the interior of said first tubular member with said first outlet, second passage means connecting said cavity with said second outlet, and a thermostatically controlled means adapted to move said auxiliary valve member toward said first seat.

19. A thermostatic gas valve as set forth in claim 18 including a hollow retainer surrounding the limited range valve member and the inner end of said stem, said retainer having a third seat for said limited range valve member, a passage in said retainer connecting the interior thereof with the interior of said first tubular member, and means biasing said limited range valve member toward said third seat to close the passage in the retainer.

20. A thermostatic gas valve as set forth in claim 19 including port means in said retainer connecting the interior thereof with said cavity, thereby forming a by-pass around said limited range valve member when the latter is engaged with said third seat.

References Cited in the file of this patent

UNITED STATES PATENTS

| | | |
|---|---|---|
| 2,505,455 | Andersson | Apr. 25, 1950 |
| 2,807,423 | Eskin | Sept. 24, 1957 |
| 2,950,865 | Lamar | Aug. 30, 1960 |

FOREIGN PATENTS

| | | |
|---|---|---|
| 803,132 | France | June 29, 1936 |
| 1,235,208 | France | May 23, 1960 |